United States Patent [19]

Stahl

[11] Patent Number: 5,663,885
[45] Date of Patent: Sep. 2, 1997

[54] PROCEDURE AND DEVICE FOR PROCESSING CUTTING MATERIAL

[76] Inventor: Anton Stahl, Am Point 62, D 83075 Bad Feilnbach Au (Bavaria), Germany

[21] Appl. No.: 427,403

[22] Filed: Apr. 24, 1995

[30] Foreign Application Priority Data

Apr. 23, 1994 [DE] Germany .................. 44 14 212.9

[51] Int. Cl.⁶ .................. G06F 19/00; G06F 17/00
[52] U.S. Cl. .................. 364/470.05; 364/470.02; 364/470.06; 364/474.08
[58] Field of Search .................. 382/8; 219/121.69; 340/709; 83/49; 364/470.01, 470.02, 470.05, 470.06, 474.08, 474.09

[56] References Cited

U.S. PATENT DOCUMENTS

| 4,327,615 | 5/1982 | Gerber et al. | 83/49 |
|---|---|---|---|
| 4,546,434 | 10/1985 | Gioello | 364/470.03 |
| 4,739,487 | 4/1988 | Bonnet et al. | 364/475 |
| 4,745,405 | 5/1988 | Himelstein et al. | 340/709 |
| 4,758,960 | 7/1988 | Jung | 364/470 |
| 4,941,183 | 7/1990 | Bruder et al. | 382/8 |
| 5,089,971 | 2/1992 | Gerber | 364/470 |
| 5,258,917 | 11/1993 | Bruder et al. | 364/474.13 |
| 5,338,915 | 8/1994 | Hildebrand et al. | 219/121.69 |
| 5,487,011 | 1/1996 | Chaiken | 364/470 |

FOREIGN PATENT DOCUMENTS

| 33746 | 4/1988 | Australia . |
|---|---|---|
| 3519806 | 8/1986 | Germany . |
| 3627110 | 8/1989 | Germany . |
| 3910322 | 10/1989 | Germany . |
| 3709373 | 6/1990 | Germany . |
| 3917957 | 12/1990 | Germany . |
| 3938663 | 5/1991 | Germany . |
| 4012462 | 10/1991 | Germany . |
| 4111304 | 10/1991 | Germany . |
| 4133040 | 4/1992 | Germany . |
| 4242702 | 7/1993 | Germany . |
| 1713413 | 7/1987 | U.S.S.R. . |

*Primary Examiner*—Paul P. Gordon
*Attorney, Agent, or Firm*—Kane, Dalsimer, Sullivan, Kurucz, Levy, Eisele and Richard, LLP

[57] ABSTRACT

The present invention relates to a procedure for optimizing the processing of cutting material, such as textiles, leather and technical fabrics and the like, as well as to a device to perform the procedure. The cutting patterns (T1, T2, T3) are first contained in the main memory of a computer (1) and then are selected. The selected patterns are projected on a cutting material on a working surface (AF) in their original size by means of direct laser projection, possibly with different colors, and are also projected on a control panel (4) in a scaled down size. The laser projections of the individual patterns are then interlocked on the cutting material by means of a control unit (5) actuated by an operator (P) positioned next to the cutting material. The patterns are interlocked to optimize use of the cutting material by accounting for the conditions of the cutting material, such as defective spots (F1, F2, F3, F4), and the shape of the cutting material. Once the patterns are finally positioned, data on these positions is then transmitted to a cutting unit, such as an automated cutter (C), by an instruction given by the operator and the citing operation is triggered.

11 Claims, 1 Drawing Sheet

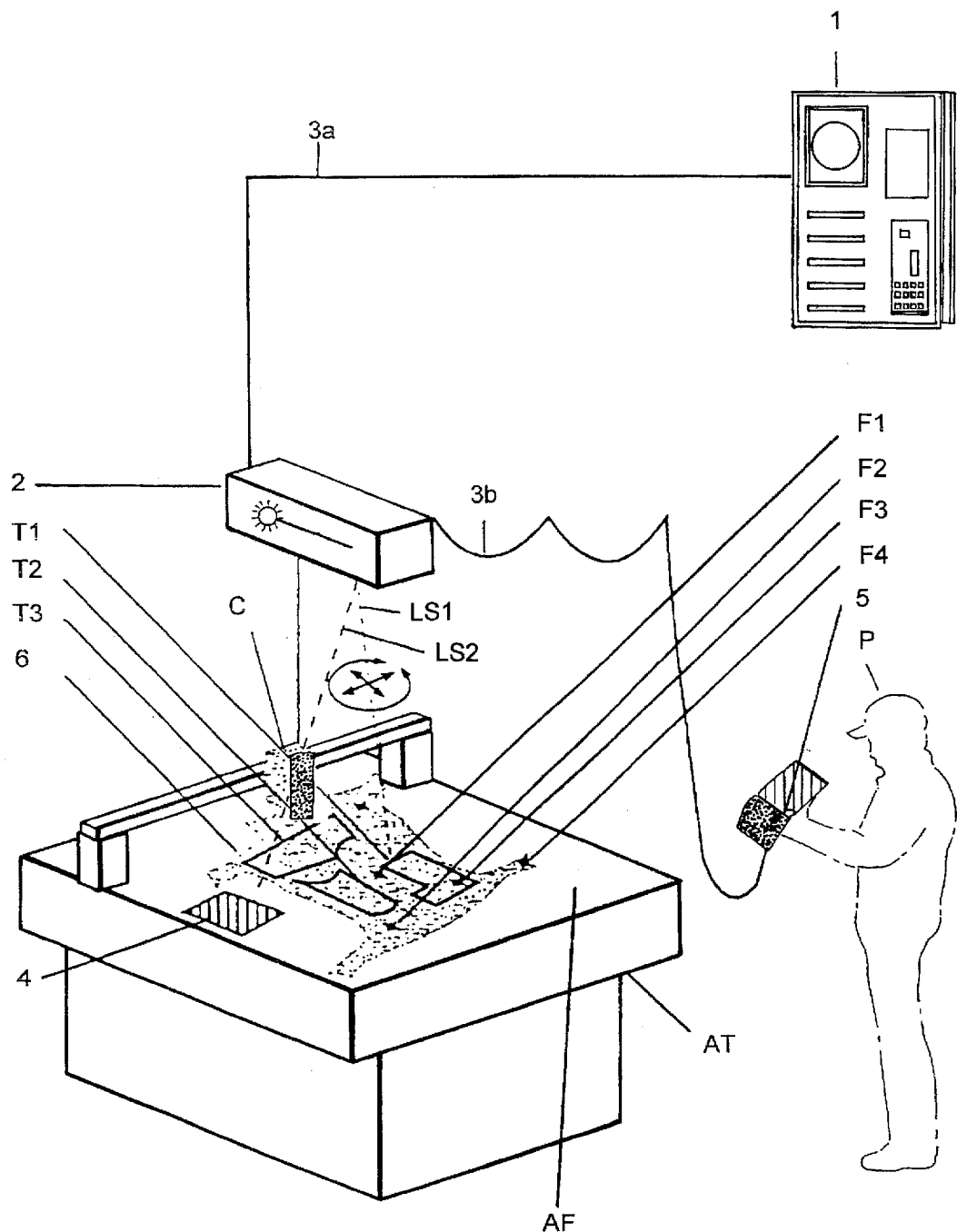

PROCEDURE AND DEVICE FOR PROCESSING CUTTING MATERIAL

BACKGROUND OF THE INVENTION

1. Field of the Invention

The invention relates to a procedure for optimizing the processing of cutting material, such as textiles, leather, technical fabrics and the like and particularly for interlocking the cutting patterns before the automatic cutting process. The invention takes into account any defective spots or other variations on the surface of a possibly particularly large-surface cutting material. The cutting patterns are stored, after having been set up in a CAD system or the like, in a computer unit as contours of the cutting material. The contours can be called from the computer unit and be positioned on the cutting material by means of a control unit. Their final position are transmittable to the cutting unit.

Thus, for instance, any leather skin, from which forms are cut to produce products from real leather (e.g., shoes, bags, furniture, garments) is a single part with areas of different quality, defects, knots and diverging colours. About the same can be said of textiles and other fabrics, especially if these are patterned.

2. Description of Prior Art

So far, cutting patterns in the form of punching dies or templates were quite frequently placed by hand on the leather surface or the like to ensure the best possible use of the material while taking into account all the properties of the material (e.g, defects, differences of colour, thickenings). Subsequently, the cutouts are either cut out by hand with a drawing knife, or punched out if a punching die is used. Automatic cutting devices, such as so-called cutters, cannot be used for such a working process.

An experienced leather cutter is required to perform preparatory work with these methods in order to achieve the necessary quality and optimization of the material to be cut. A great part of his work and time is used for heavy craftman's work. For instance, placing of the templates and punching dies, punching and cutting with the drawing knife. This work is rather laborious and far from being effective.

In addition, the use of punching dies is only appropriate if long pattern cycles permit the longest possible use of the same dies which are rather expensive. The high costs of approximately DM 250,000 and more per year for manufacturing and maintaining such tools does not justify their use for short pattern cycles. Moreover, handling of the punching dies is time consuming and requires considerable exertion. Attendant circumstances to the handling of such dies are damages to health and interruptions of work.

In OE-PSS E 33 746 B (EP 01 65 890), a procedure and a device are disclosed for the reciprocal arrangement of cutting patterns on a pad for drawing and/or cutting. The coordinates of diverse templates to be cut out are stored in a main memory and are displayed on a monitor. They are projected by means of a video projecting unit directly from the monitor onto the material to be cut which lies on a pad. Such templates can be moved on the monitor via the video projecting unit using a control unit connected to the computer until their final position has been reached. These positions are then displayed on the monitor. When the contours have been interlocked, the cutting operation is triggered.

Such a procedure is only applicable for small templates and hence for small patterns since their size is limited by the dimensions of the screen of the monitor. An enlargement of what is on the screen is not possible because the resolution of lines of the video projector will lead to blurs. The contours of cutting patterns will thus become unrecognizable on the leather skin or the like.

A similar procedure and a device for optimizing the cutting of material was disclosed in DE-PS 36 27 110, which also uses a computer and a monitor to display the contours to be cut. Taking into account any defective spots of the material to be cut, these contours are projected on the cutting material by an electronic projecting unit of great light transmitting capacity as enlarged contours in original size as compared to the monitor image. The total area of the cut obtained is calculated after positioning and then put in a relation to the area of the material to be cut. The automatic cut is performed only when a specific degree of utilization has been reached.

This proposed solution for optimizing the cutting of material has some drawbacks too. A monitor image is again projected by video. Instead of an electronic projector of great light transmitting capacity, a laser so scanner system could be used, which in turn has some disadvantages. For example, the rather slight spot velocity of the mechanical scanner system and consequences of the rather slight spot velocity. Here again, the operating personnel have to move to and from between the monitor and the working area and interlock the cutting patterns on the screen. In addition, this process requires that both the shape and the condition of the leather skin or the like should be completely visible on the monitor which, however, cannot be fully achieved. Besides, there are fixed limits of tolerance with such a procedure which cannot be exceeded and a considerable amount of devices are required too.

In fact, such activities can still be carried out much better and more effectively by man, as one has not yet succeeded to assess the quality of a leather skin or the like by projecting any parts at the same time on the skin, which would be indispensable. None of the known systems enables the operating personnel to work directly on the cutting material.

These drawbacks are overcome by the present invention.

SUMMARY OF THE INVENTION

The present invention as described in the accompanying claims is based on the task to provide a procedure for the processing of leather and fabrics, such as textile and technical fabrics, and a device for carrying out the procedure. The invention particularly provides the leather processing industry with aids that are adequate to save punching dies and pneumatic presses as well as to replace possible manual cutting processes by an automatic cut. An advantage obtained with the present invention consists especially of an increased productivity of the individual leather worker, as he can concentrate on his essential duties, namely placing the patterns on the cutting material under quality viewpoints while making optimal use of the material. The former procedures, which strongly affect health, are avoided by making use of the procedure according to the invention. Besides, no more monitors are required. Moving of operators to and from the monitor workplace to the working area with its cutting material is dispensed with.

Another advantage is to be seen in direct personal intervention with and inspection of the cutting material by the operating staff, instead of having to assess and interlock the patterns and the material at the monitor. The operator is in direct contact with the material to be processed, with the consequence that defective spot tolerances and other variations can still be accounted for during inspection. It is thus unnecessary to detect and store any defective spots on the leather surface or the like beforehand because this operation is carried out by the operator at the same time as the cutting patterns are interlocked and placed on the cutting material. As a result, among other things, there is a considerable saving of material. Moreover, it is possible to project all cutting patterns which are to be interlocked or which have been interlocked.

Another essential advantage is that, due to the projection by laser beam on the working surface, the leather skin or the like is accurately illuminated so that all defective spots and even colour shades are immediately recognized and accounted for by the operator. The material to be cut remains on the working surface for the whole processing time and is cut immediately to size, unless an intermediate storage of the cutting material is desired. Finally, a presentation of different cutting patterns by their significance, quality or relationship to groups becomes possible by a laser in various selective colours. The cutting patterns can be projected on a reduced scale and simultaneously in their original size on a control panel and on the working surface, respectively.

Further embodiments of the invention will now be described by way of example with reference to the accompanying drawing.

BRIEF DESCRIPTION OF THE DRAWING

The accompanying FIGURE illustrates the apparatus and method for optimizing the process of arranging patterns on cutting material.

DESCRIPTION OF THE PREFERRED EMBODIMENTS

The device for carrying out a procedure for the processing of material as proposed by the invention comprises essentially a computer 1 with pertinent keyboard and other parts such as a PC, a cutting table AT with a working surface AF for the cutting material 6 lying thereon, an assigned laser beam unit 2 which is arranged for emitting preferably several laser beams LS1 and LS2 for projecting a pattern on various scales and possibly also in colours, as well as pertinent data cables 3a to the laser unit 2 and 3b to the manual control unit for the operating staff P. On the cutting table AT, namely on or by its working surface AF, there is a control panel 4 for the scaled down laser image LS2 of the pattern to be cut, for the listing and calling of codes from the computer memory which are assigned to the cutting patterns T1, T2, T3. In addition, the manual control unit 5 for the operator P controls the laser unit 2. The necessary control lines 3b for the laser unit 2, such as a data cable or a radio relay link and for triggering the cutting device C is provided.

The procedure according to the invention is carried out as follows. The contours of the patterns T1, T2, T3 to be cut out are made visible by laser radiation LS2 scaled down on the control panel 4 which is located by the working table AT. Meanwhile, the final placement of the patterns, taking into account any defective spots F1, F2, F3, F4, tolerances or other variations is carried out by the operator using his manual laser control unit by means of the laser projection LS1 of the cutting patterns in original size on the surface of the leather skin 6, i.e., directly in original size on the working table 3. The directions of movement of the laser unit 2 and thus of the laser beams LS1, LS2 are indicated by arrows and are all controllable by the operator P via his manual laser control unit 5. The patterns T1, T2, T3 to be cut in a certain fashion, such as in an order or according to specific quality stages or priorities are selected from the memory of the computer 1 via the control panel 4 by the operator P via the scaled down projection of the cutting patterns by the laser beam LS2, via a keyboard or via a similar method. Meanwhile, the further selection of the cutting patterns (e.g., T1, T3) and the placement on the cutting material (e.g., a leather skin 5) is carried out by the laser control unit 5 of the operator. When the placing and interlocking of the cutting patterns T1, T2, T3 has been concluded, taking into account any defective spots (e.g., F1, F2, F3, F4) and possibly the setting of markings, the cutting operation of cutter C is triggered by the operator via the manual laser control unit 5, whereupon the device becomes ready to carry out the next procedure.

The cutting patterns T1, T2, T3 are selected, for instance, according to orders or according to an additional assortment of other factors, such as by following preset quality criteria or regroupings, while a combination of several orders is always possible. Here, the main criterion for selection is the matching of individual patterns to be cut out.

In order to distinguish different orders, groups, quality zones within a part, it is possible to use different colours of the laser beams LS1, LS2.

Obviously, the subject of the invention is not restricted to the described example of leather processing. It is also possible to process, for example, other cutting materials, such as textiles, particularly those with large patterns. Data can be transmitted, for example, by wireless, optoelectronically or by radio relay link. Likewise, it is possible to trigger the cutting process from other locations apart from the manual laser control unit 5 of the operator, such as from the cutter C itself, from the control panel 4 or from other suitable switching points. Instead of contours, it is also possible to project the areas of the cutting patterns by means of laser beams, hatches, curves, guide lines, codes or other means and even in different colours. This permits simplification of the selection and markings. The areas of the cutting patterns can also be filled out and/or lettered or marked.

I claim:

1. Procedure for optimizing the processing of a cutting material (6), specifically for interlocking cutting patterns (T1, T2) before an automated cutting process by a cutting unit (C), by taking into account any defective spots (F1, F2) on the surface of said cutting material, said cutting patterns after having been set up in a computer system being stored as contours in a computer (1) from where the cutting patterns can be called and be positioned on said cutting material by means of a control unit (5) to a final position which is transmittable to said cutting unit (C), characterized by the following procedure steps:

i. selection of cutting patterns from the memory of said computer via said control unit by an operator positioned by said cutting material,
   ii. direct projection of the contours of the selected cutting patterns by means of at least one laser on at least one optional spot and in any size on said cutting material,
   iii. selection of specific contours from said selected cutting patterns and interlocking said contours on said cutting material by said operator and, when the selection and interlocking of said contours on said cutting material has been optimized, coordination of a cutting order for said cutting unit,
   iv. triggering said cutting process by said control by the operator, all processing steps on said cutting material being carried out directly by said operator and said cutting material not being moved until said cutting process is finished.

2. Procedure according to claim 1, characterized in that the contours of said cutting patterns of said cutting material are projected by said at least one laser in different sizes on said cutting material.

3. Procedure according to claim 1, characterized in that the contours of said cutting patterns are projected by said at least one laser in original size on said cutting material, and are projected by said at least one laser scaled down on a control panel near said cutting material.

4. Procedure according to claim 1, characterized in that said different laser projections are simultaneously carried out.

5. Procedure according to claim 1, characterized in that said contours of different cutting patterns or groups of cutting patterns are projected in different colors.

6. Device for carrying out the procedure according to claim 1, characterized in that a computer (1) for data exchange is connected by connecting means to a movable laser beam unit (2), a control panel (4) by a working surface (AF) of a working table (AT) and to said control unit (5) with the operator as well as to said cutting unit (C).

7. Device according to claim 6, characterized in that said at least one laser (2) comprises at least a first and a second laser where said first laser (LS1) carries out a projection of the contours of said cutting patterns (T1, T2) in original size on said cutting material (6) and said second laser (LS2) carries out a projection of the contours of said cutting patterns (T1, T2) in scaled down size on said control panel (4).

8. Device according to claim 6, characterized in that said control panel (4) is located by said working table (AT) and is connected electrically to said at least one laser (2) and to said computer (1).

9. Device according to claim 6, characterized in that a portable control unit (5) is provided and is connected electrically to said at least one laser (2) and to said computer (1).

10. Device according to claim 6, characterized in that said at least one laser (2) is equipped with two laser beams (LS1, LS2) which project said contours on said working surface (AF) simultaneously in different scales and in different colors.

11. Device according to claim 6, characterized in that the connecting means (3a, 3b) between the individual components of the device consist of electric cables, glass fibre cables, opto-electronic and/or radio relay links.

* * * * *